US012591782B2

(12) United States Patent
Botkin

(10) Patent No.: US 12,591,782 B2
(45) Date of Patent: Mar. 31, 2026

(54) INTELLIGENT SCALING FACTORS FOR USE WITH EVOLUTIONARY STRATEGIES-BASED ARTIFICIAL INTELLIGENCE (AI)

(71) Applicant: Bank of America Corporation, Charlotte, NC (US)

(72) Inventor: Garrett Botkin, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 947 days.

(21) Appl. No.: 17/851,197

(22) Filed: Jun. 28, 2022

(65) Prior Publication Data

US 2023/0419118 A1 Dec. 28, 2023

(51) Int. Cl.
G06N 3/08 (2023.01)
G06N 3/086 (2023.01)

(52) U.S. Cl.
CPC .................................... G06N 3/086 (2013.01)

(58) Field of Classification Search
CPC ............................... G06N 3/086; G06N 3/126
See application file for complete search history.

(56) References Cited

U.S. PATENT DOCUMENTS

2007/0094167 A1* 4/2007 Sendhoff ................ G06Q 10/04
703/2
2007/0208677 A1* 9/2007 Goldberg ............... G06N 3/126
706/13

OTHER PUBLICATIONS

Emmerich et al ("Evolution Strategies" 2018) (Year: 2018).*
Ahrari et al ("An Improved Evolution Strategy with Adaptive Population Size" 2013) (Year: 2013).*
Gong et al ("DE/BBO: a hybrid differential evolution with biogeography-based optimization for global numerical optimization" 2011) (Year: 2011).*
Ghosh et al ("An improved differential evolution algorithm with fitness-based adaptation of the control parameters" 2011) (Year: 2011).*

* cited by examiner

Primary Examiner — Lut Wong
(74) Attorney, Agent, or Firm — Weiss & Arons LLP

(57) ABSTRACT

A method for optimizing an application of an evolutionary-strategy-based application of Artificial Intelligence (AI) is provided. The application may be performed on a pre-determined surface. The method may include selecting a first group of candidates, determining a mean and standard deviation associated with the first group of candidates, using a static scaling factor to formulate a size of a population of candidates for generation, using the mean and the standard deviation to generate, according to the size, the population of candidates, and selecting a second group of candidates from among the population of candidates. Each member of the second group of candidates is closer to a minimum value of the surface than a remainder of the population of candidates. The remainder of the population of candidates may be formed from a group of non-selected candidates among the population of candidates.

21 Claims, 19 Drawing Sheets

Equation to be optimized:
$ax^2+bx+c$

902

Distribution: $\mu+s$ N(0,1)

1004

Mean $= \mu$

1006

1002

1008

Standard
Deviation $= s$

Problem 1:
Diminishing Standard Deviation

FIG. 19

INTELLIGENT SCALING FACTORS FOR USE WITH EVOLUTIONARY STRATEGIES-BASED ARTIFICIAL INTELLIGENCE (AI)

FIELD OF TECHNOLOGY

Aspects of the disclosure relate to artificial intelligence (AI.) More specifically, aspects of this disclosure relate to AI techniques known generally as evolutionary strategies.

BACKGROUND OF THE DISCLOSURE

Two important classes of algorithms for optimizing implementation of AI include gradient descent and evolutionary strategies.

Gradient descent (referred to in the alternative as steepest descent) is a first-order iterative optimization algorithm for finding a local minimum of a differentiable function. The general idea behind gradient descent is to take repeated steps in the opposite direction of the gradient of the function at a currently selected point because this is the direction of the steepest descent.

Evolutionary strategies relate to search and optimization methods belonging to the class of Evolutionary Algorithms which use mutation, recombination, and selection applied to a population of individual candidate solutions in order to evolve iteratively better and better candidate solutions. For the purposes of this application, the candidate solutions may be referred to in the alternative as "candidates."

In order to iterate to better and better candidate solutions, evolutionary strategies typically select a seed distribution of candidates along an equation such as the equation—$ax^2+bx+c$. It should be noted that evolutionary strategies may be implemented on any continuous equation and not just the aforementioned quadratic equation.

Once the seed is determined, a first set of candidates are generated. The generation of the candidates may include determining a standard deviation ($\sigma$) as a scaling factor for the scope of the candidates and a mean value ($\mu$) to determine the transition location of the candidates along the equation. A distribution of the seed candidates may be determined, under certain conditions, by the equation $\mu+\sigma N$ (0,I), where N is a randomly-generated point along a typical Gaussian Evolution Strategy and I is the identity matrix, which, in this equation serves like a "1".

There are issues that arise with the implementation of evolutionary strategies.

One of the issues that reduces the efficiency of implementation of evolutionary strategies is the fact that a search space involved with the creation of new group(s) of candidates scales poorly.

It would be desirable to provide methods and systems for increasing the scalability of the creation of new group(s) of candidates.

More particularly, it would be desirable to produce an algorithm that uses known values to tune a specific scaling factor for a given surface, typically expressed through an equation, to be optimized.

SUMMARY OF THE DISCLOSURE

One or more, non-transitory, computer-readable media storing computer-executable instructions which, when executed by a processor on a computer system optimize an application of an evolutionary-strategy-based application of Artificial Intelligence (AI). The application may be performed on a pre-determined surface. The processor may be configured to determine a mean and standard deviation associated with a second location on the surface.

The processor may also be configured to use a static scaling factor to formulate a size of a population of candidates for generation and to use the mean and the standard deviation to generate, according to the size, the population of candidates.

Preferably thereafter, the processor may be configured to select a second group of candidates from among the population of candidates. Each member of the second group of candidates is preferably closer to a minimum value of the surface than a remainder of the population of candidates. The remainder of the population of candidates is formed from a group of non-selected candidates among the population of candidates.

The processor may be further configured to derive the static scaling factor from a ratio. The ratio may include the following: a number corresponding to the selected group of candidates divided by a number corresponding to the population of candidates.

The processor may, in certain embodiments, be further configured to form a representative graphical depiction of a plurality of static scaling factors. The graphical depiction may be arranged using a y-axis formed from a range of static scaling factors and an x-axis formed from the ratio described above.

In some embodiments the processor may be configured to generate an algorithm based on the surface. The algorithm may be derived from a plurality of static scaling factors. The algorithm may be used to obtain a predetermined static scaling factor in response to receiving a predetermined number of first, selected, candidates and a predetermined number of a population of candidates.

In some embodiments, the processor may be configured to adapt a covariance matrix using the static scaling factor.

Some embodiments may involve using the mean and the standard deviation to generate the population of candidates as follows. These embodiments may use the mean to locate the population of candidates along the pre-determined surface. Some embodiments may involve using the standard deviation to determine the maximum distribution of the population of candidates.

It should be noted that the surface may be defined by a new problem/class of problems/equation/class of equations/class of surfaces or other relevant construct.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows a graphical expression of an equation that is more complex (i.e., two different minima and instead of one) than the equation shown in FIG. 3;

FIG. 19 shows generation of a population of candidates at a random location;

DETAILED DESCRIPTION OF THE DISCLOSURE

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
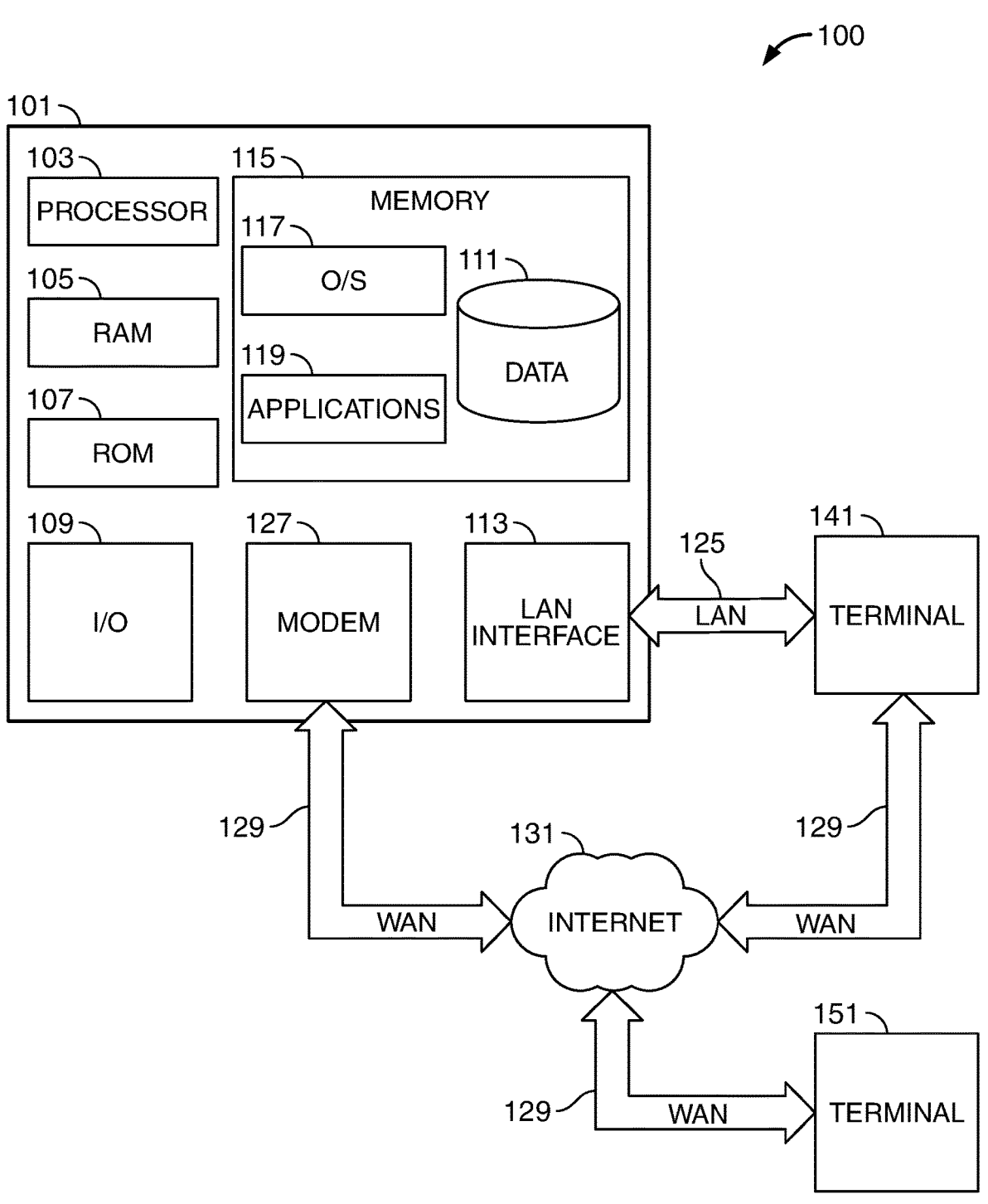
FIG. 1 shows an illustrative block diagram of system that may be configured in accordance with the principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI) as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
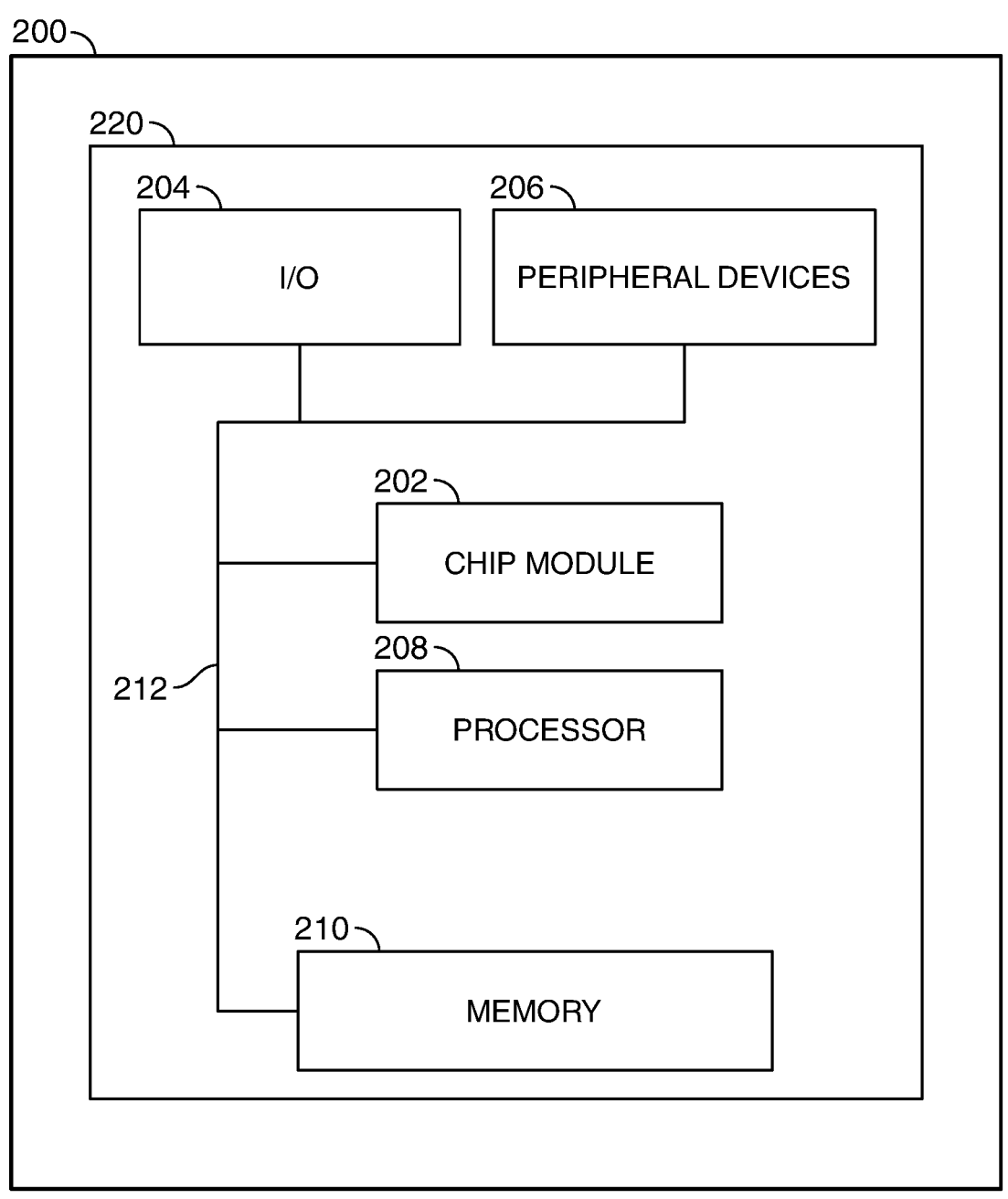
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
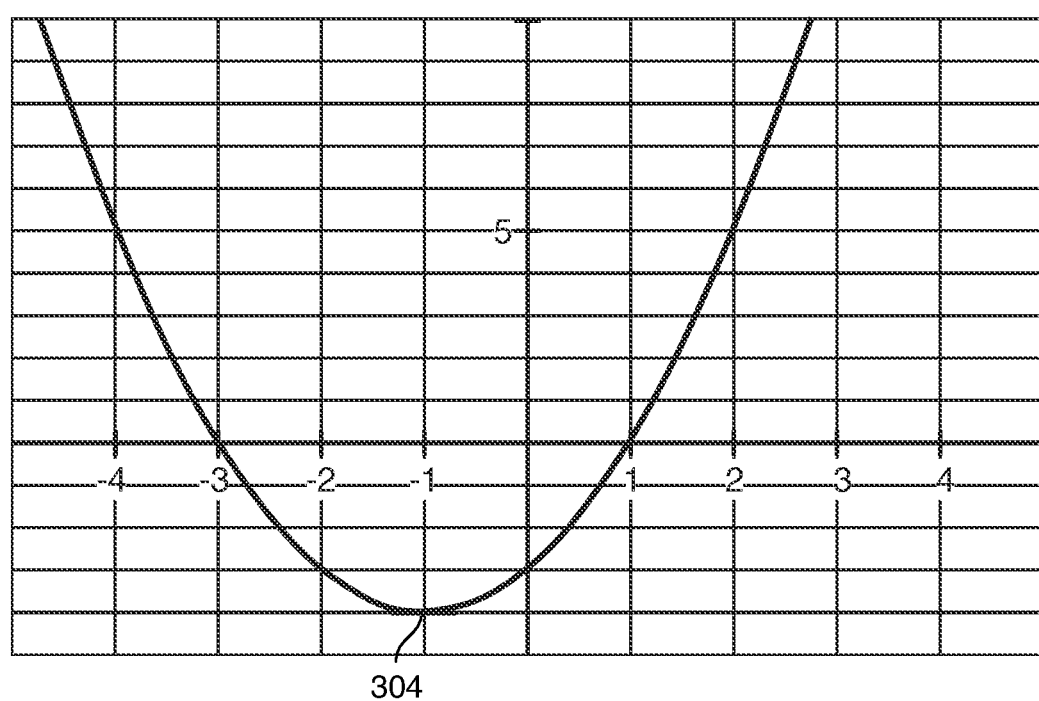
FIG. 3 shows a graphical expression of a first equation that may be analyzed using evolutionary strategies.

FIG. 3 shows a graphical expression 302 of a first equation that may be analyzed and/or optimized using evolutionary strategies, or by some other suitable AI approach. With respect to the equation shown in FIG. 1—evolutionary strategies may be implemented, according to the disclosure set forth herein, to optimize the equation. One way to optimize the equation is to determine at which point along the equation closest to "reality"—i.e., a match of the real, existing, signals.

For example, if a particular person's voice was being reproduced using an electronic sound-reproducing device, then the equation may be used by AI to help the electronic reproduction replicate reality. In an equation such as the equation shown in FIG. 3, the minimum (or, conversely, the maximum (not shown)) of the equation may reflect the convergence of the digitally reproduced voice and the real voice. In such an exemplary representation, the minimum may represent the location of least quantifiable error.

FIG. 4 shows a graphical expression 402 of an equation that is more complex (i.e., two different minima 404 and 406 instead of one) than the equation shown in FIG. 3. In the equation 402 shown in FIG. 4 the existence of multiple minima increases the overall complexity of the AI needed to determine a global minimum—i.e., a minimum that is true for the entirety of equation 402 in FIG. 4 as opposed to for just a portion of equation 402.

Figure 5:
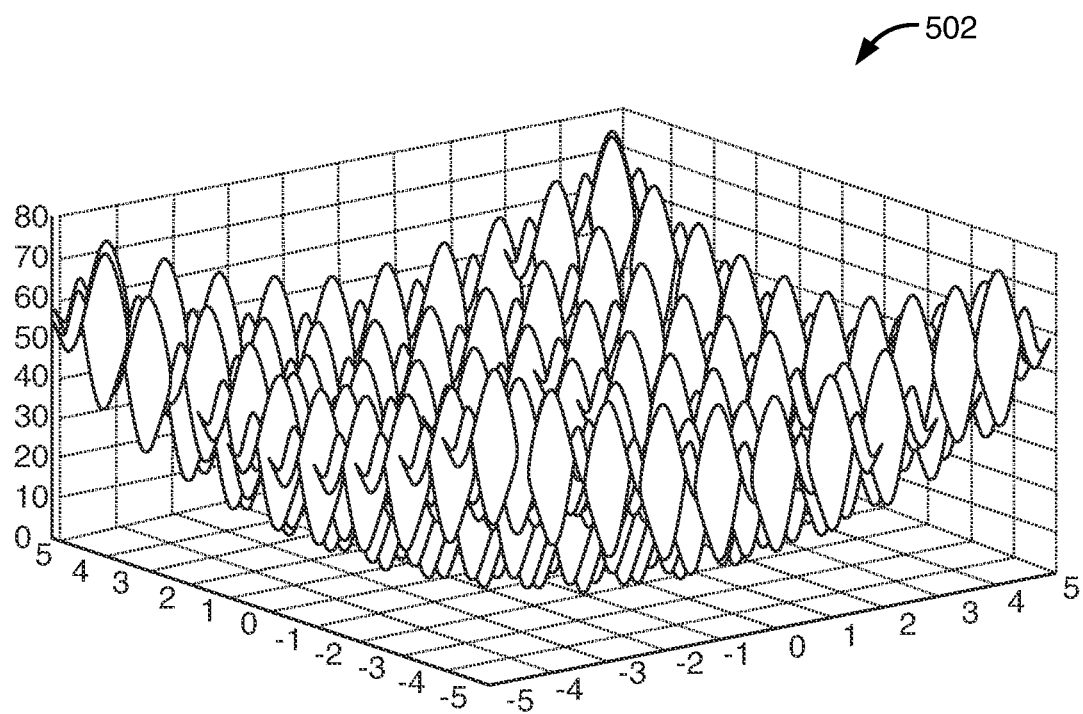
FIG. 5 shows a graphical expression of equation that is far more complex than equations in FIGS. 3 and 4.

FIG. 5 shows a graphical expression of equation 502 that is far more complex than equations 302 and 402. The optimization of an equation such as the one shown in FIG. 5 is far from trivial and needs to be reduced using some AI optimization strategy. Embodiments described herein involve AI that includes evolutionary strategies. The evolutionary strategies are employed as part of an optimization algorithm in order to obtain a minimum, or other relevant solution, for a given equation.

Figure 6:
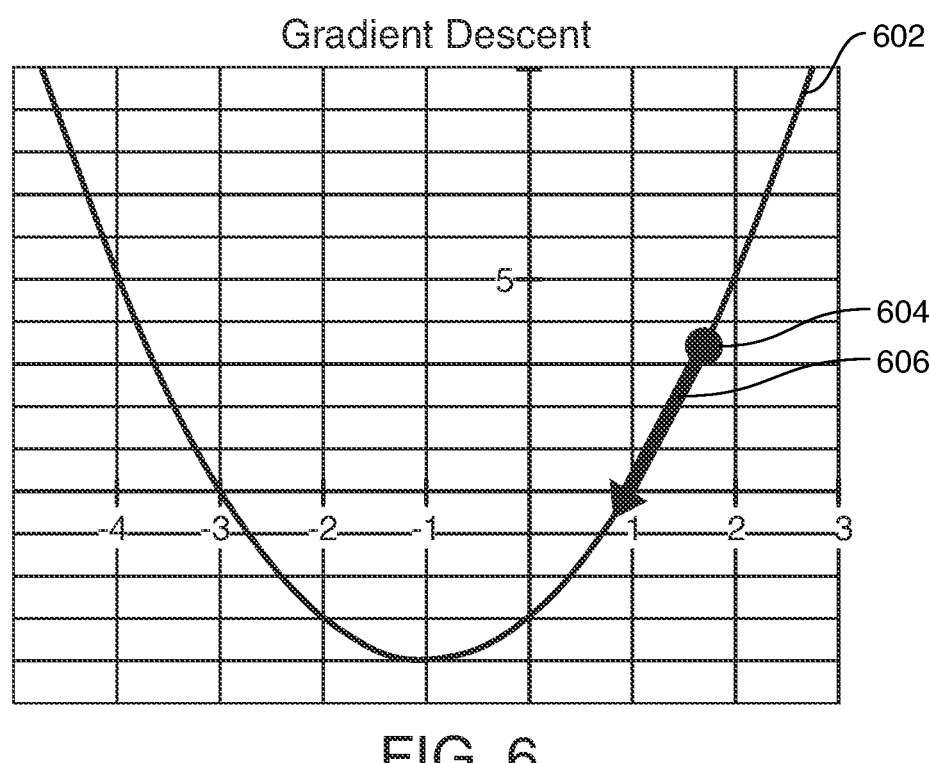
FIG. 6 shows an illustrative approach to using gradient descent to optimize an equation.

FIG. 6 shows an illustrative approach to using gradient descent to optimize an equation 602. The gradient descent approach involves determining a minimum for equation 602. This illustrative approach involves picking a randomly-generated point 604 along equation 602. Thereafter, a determination should be made regarding which way is the "descent."

Figure 7:
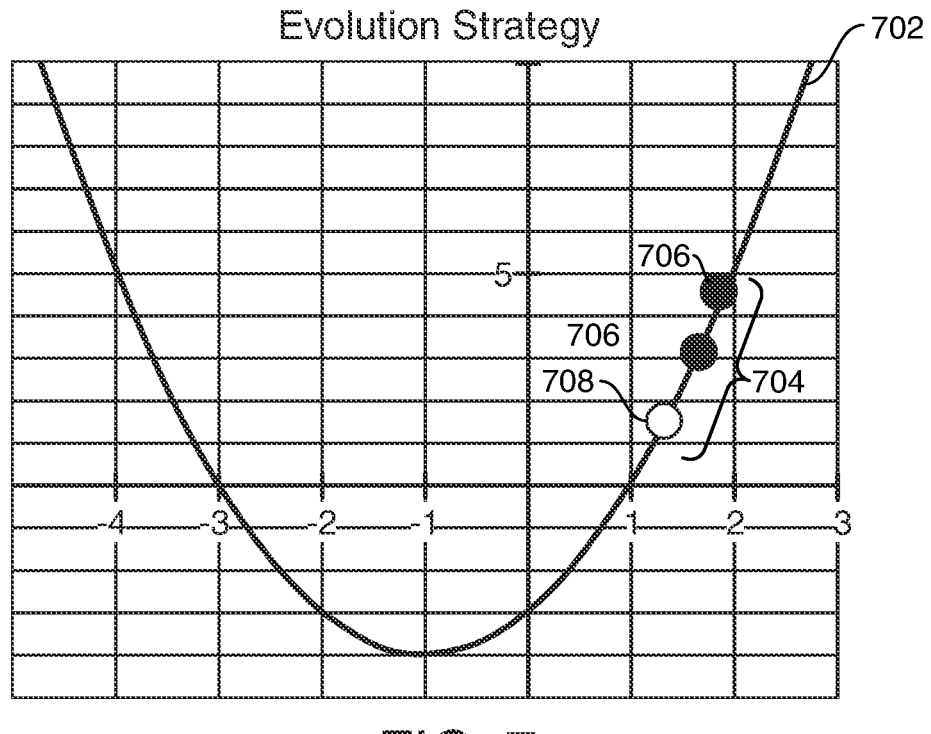
FIG. 7 shows an illustrative approach to using evolutionary strategies to optimize an equation.

FIG. 7 shows an illustrative approach to using evolutionary strategies to optimize an equation 702. Using evolutionary strategies may also involve determining a minimum for equation 702. This illustrative approach involves picking a randomly-generated point (not shown) and, based on randomly-generated point, creating multiple candidates along equation 702.

The evolutionary strategies optimization then proceeds to evaluate the candidates to determine which candidate(s) is the closest to the desired minimum. In the equation 702 shown in FIG. 7, candidates 706 are discarded as furthest from the desired minimum. Candidate 708 is selected as the closest to the desired minimum. Candidate 708 is then used for the next round of candidate generation. The distance along the x-axis is identified as the transition from the 0-point on the axis.

Figure 8:
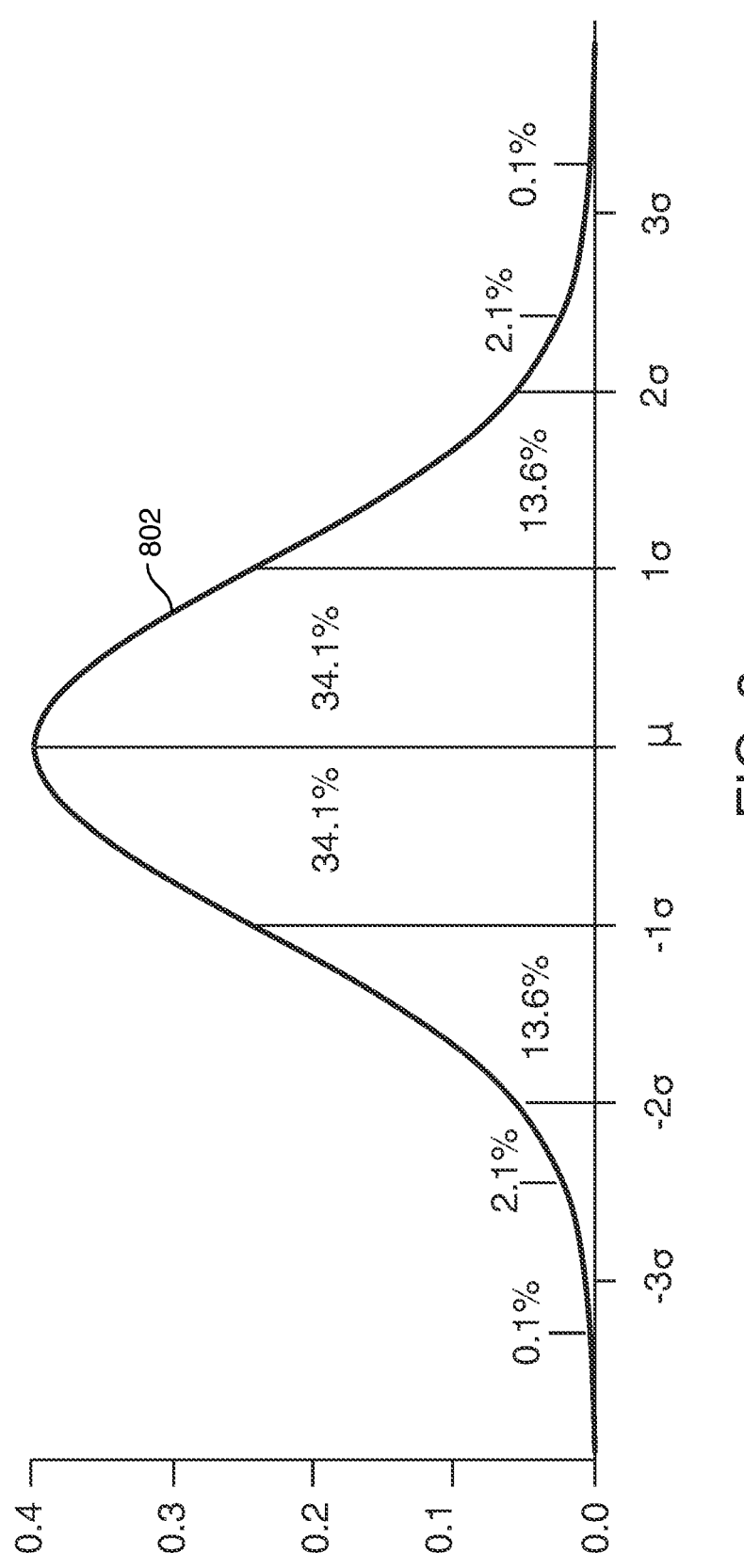
FIG. 8 shows a Gaussian Evolution strategy for use with respect to the current disclosure.
Figure 9:
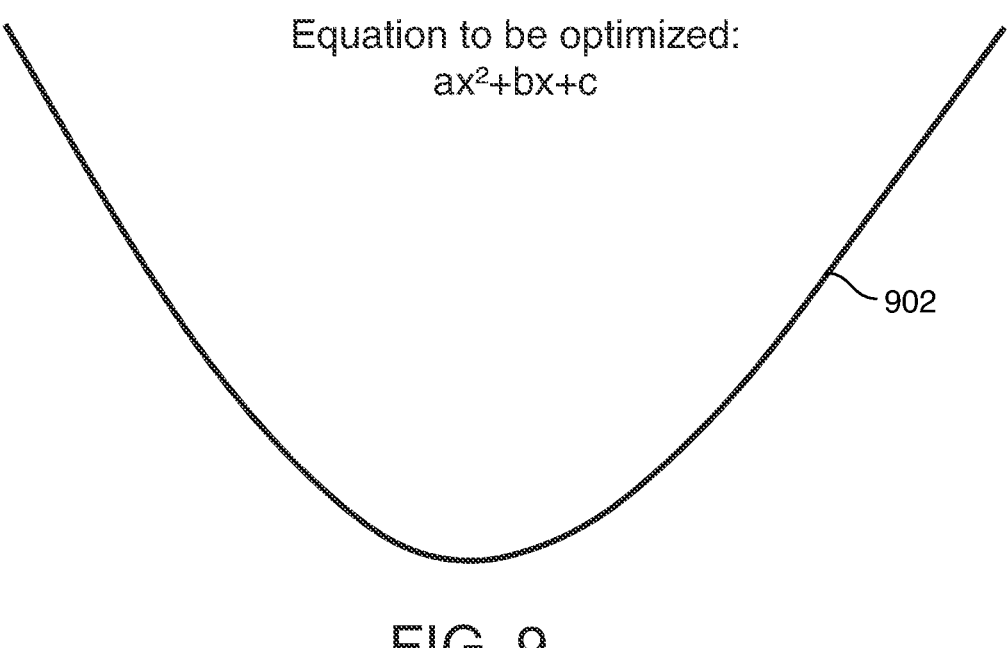
FIG. 9 shows a graphical expression of an equation $ax^2+bx+c$ to be optimized.

FIG. 8 shows a Gaussian Evolution strategy for use with respect to the current disclosure. The strategy derives a mean (in this case 0.4) and a standard deviation (34.1%) and then uses these values as follows to determine a starting point on the equation. FIG. 9 shows a graphical expression of an equation 902 $ax^2+bx+c$ to be optimized.

Figure 10:
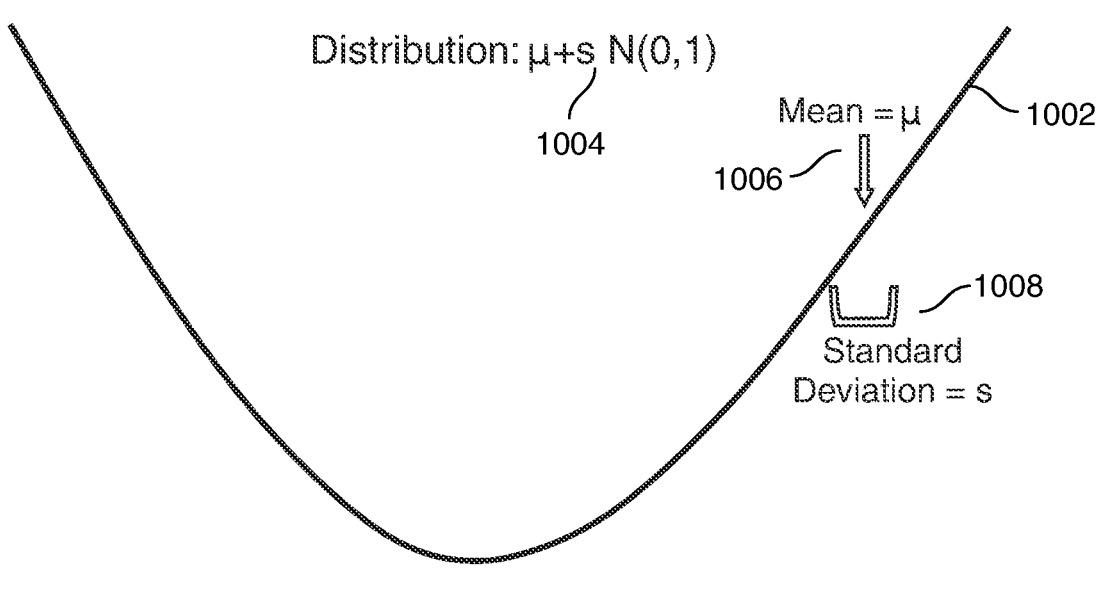
FIG. 10 shows an exemplary normal distribution that may be used to select a point according to the Gaussian distribution.

FIG. 10 shows an exemplary normal distribution 1004 that may be used to select a point according to the Gaussian distribution 802 shown in FIG. 8. Normal distribution 1004 shows $\mu$ 1006+$\sigma$N 1008 (0,I), where N is a randomly-generated point along a typical Gaussian Evolution Strategy and I is the identity matrix, which, in this equation serves like a "1". According to the normal distribution—$\mu$ 1006 corresponds to the mean of the generated candidates, and $\sigma$ 1008 corresponds to the spread, or the maximum spread, of the candidates.

Figure 11:
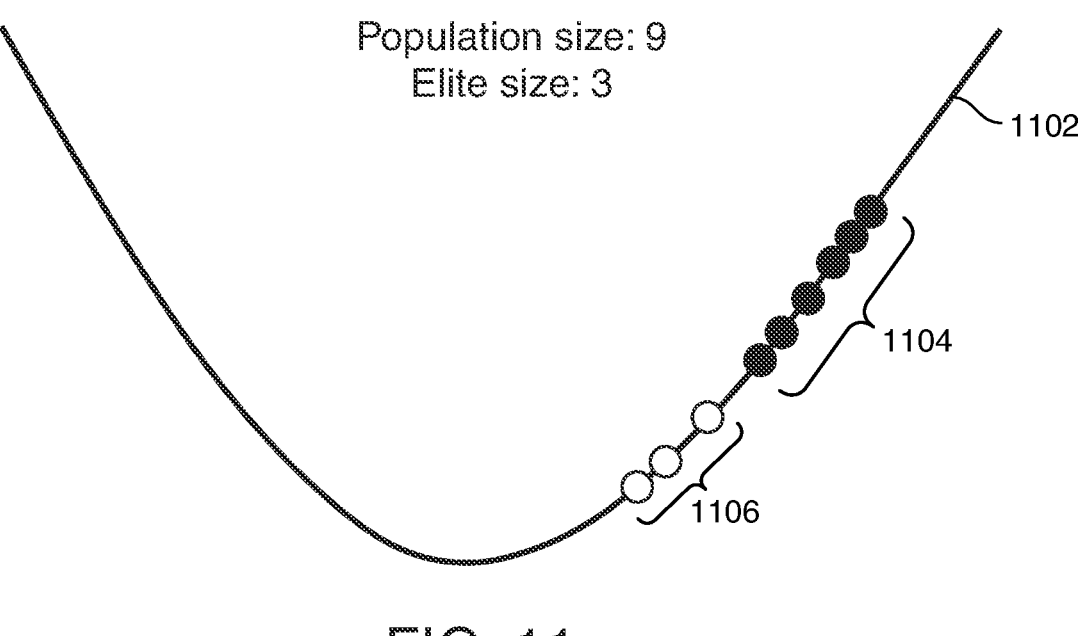
FIG. 11 shows an equation with a nominal distribution of candidates.

FIG. 11 shows equation 1102 with a nominal distribution of nine (9) candidates. Candidates 1104 represent the candidates that performed worse vis-à-vis proximity to the minimum. Candidates 1106 represent the candidates that performed best vis-à-vis proximity to the minimum.

Figure 12:
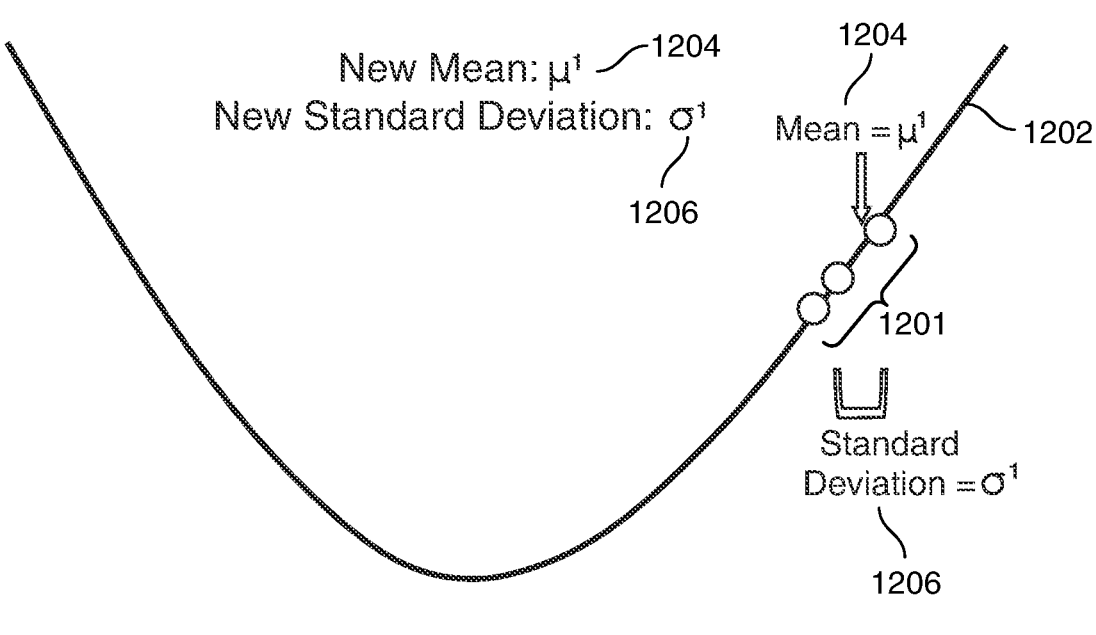
FIG. 12 shows the best-performing candidates along the equation in FIG. 11.

FIG. 12 shows the best-performing candidates 1201 along equation 1202. The location along the equation 1202 is determined by $\mu^1$ 1204 and the spread of the candidates along equation 1202 is determined by $\sigma^1$ 1206.

Figure 13:
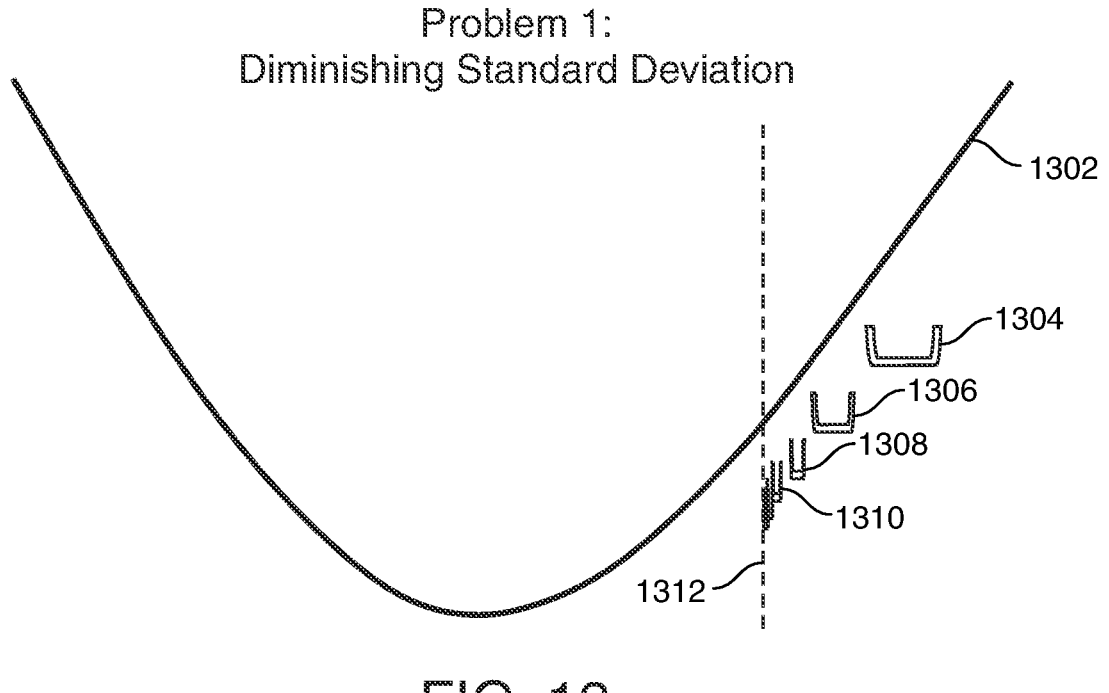
FIG. 13 shows one problem associated with evolutionary strategies.

FIG. 13 shows one problem associated with evolutionary strategies. This problem is typically referred to as "diminishing standard deviation." FIG. 13 shows an equation 1302.

FIG. 13 also shows a first $\sigma$ at 1304, a second $\sigma$ at 1306, a third $\sigma$ at 1308, and a fourth $\sigma$ at 1310. Finally, the standard deviations collapse at marker line 1312.

The problem illustrated in FIG. 13 is that, with each new set of candidates, the standard deviation may tend to diminish in a sub-optimal, with respect to efficiency, way. As such, the standard will fail to efficiently arrive at the minimum. It is noted that continued creation of candidate sets consumes substantial resources in AI optimization. As such, diminishing standard deviations costs relatively substantial amounts of resources to optimize an equation. In fact, diminishing standard deviations may cause the optimization to collapse at marker line 1312. This is because continued generation of candidates may collapse the standard deviations to zero prior to arriving at a minimum of equation 1302.

A solution to the diminishing standard deviation problem involves providing an algorithm that sets an appropriate scaling factor to the generation of future candidate sets. An appropriate scaling preferably causes the future generation of candidates to converge efficiently, with respect to computer resources, on the minimum (either a local minimum or a global minimum) of a given equation or other surface definition.

Figure 14:
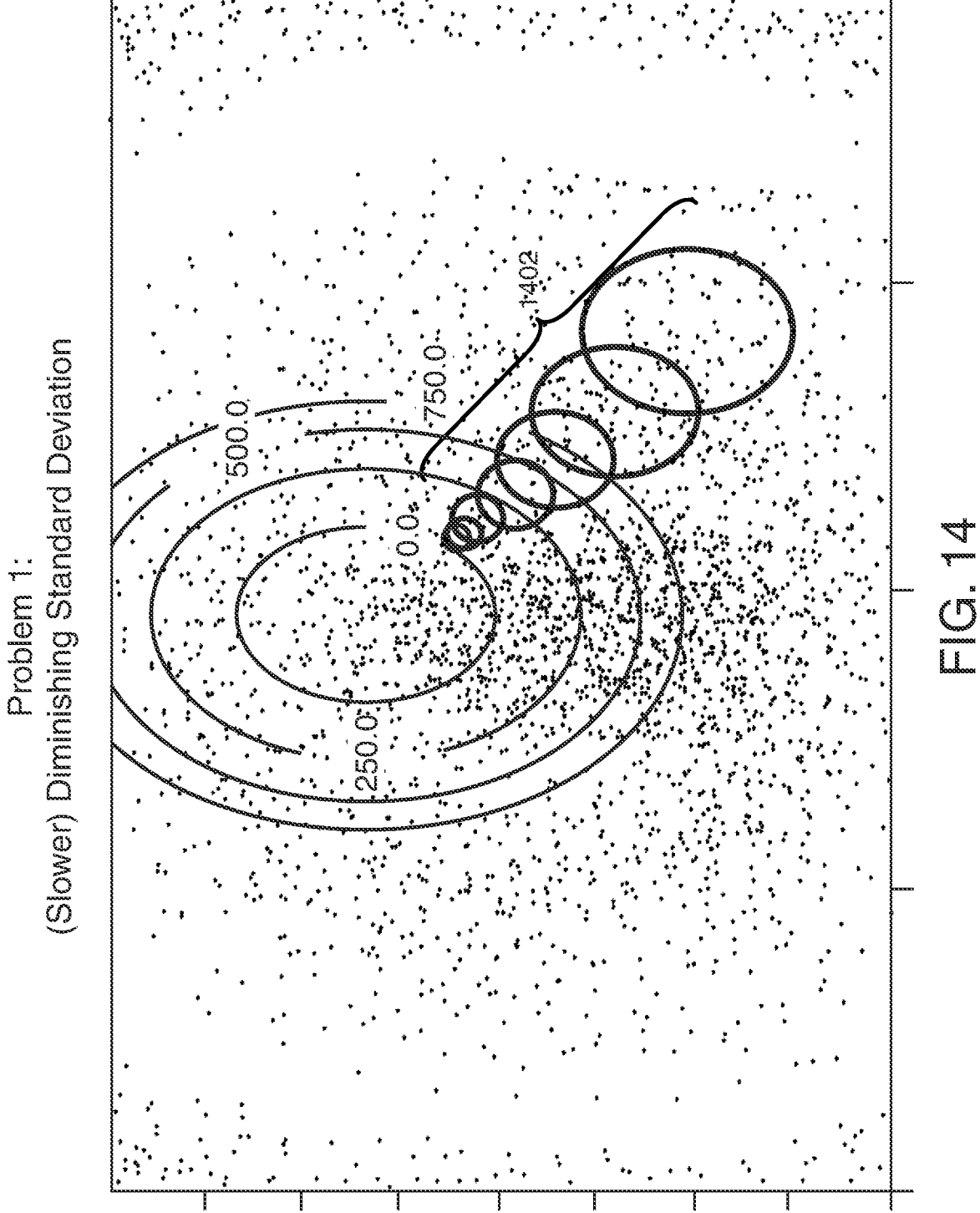
FIG. 14 shows how a scaling factor may affect convergence on a minimum of an equation.

FIG. 14 shows how a scaling factor 1402 may affect convergence on a minimum of an equation.

Figure 15:
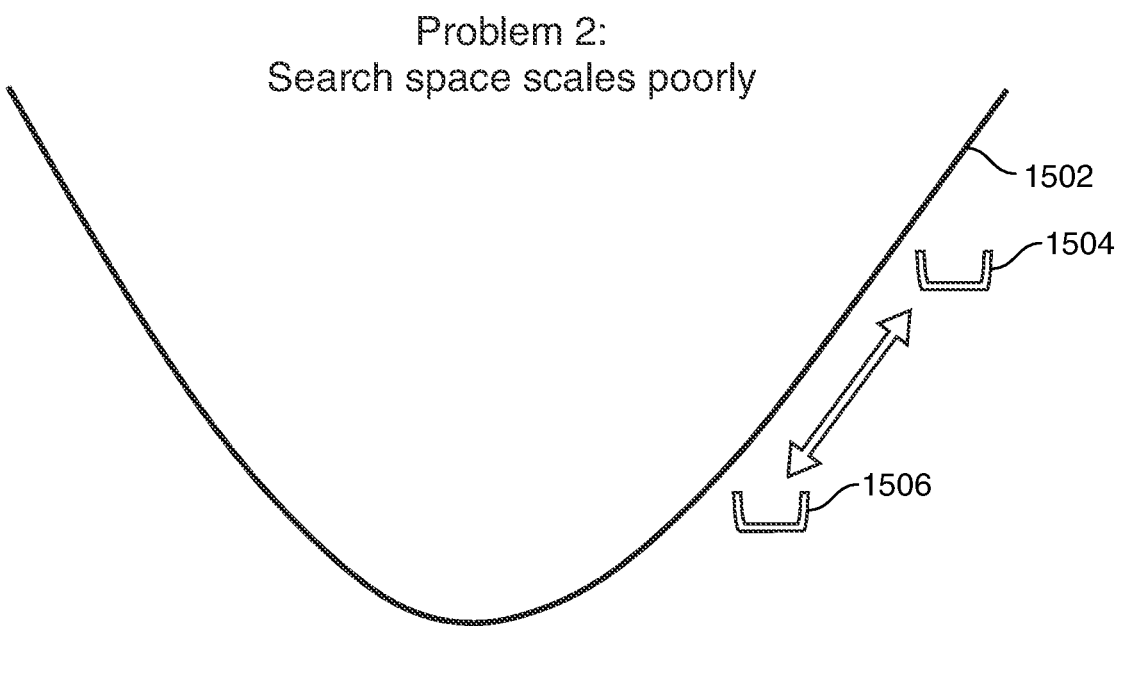
FIGS. 15-16 represent how search space may scale poorly—i.e., fail to easily determine which direction is closer or further to the minimum along equation.
Figure 16:
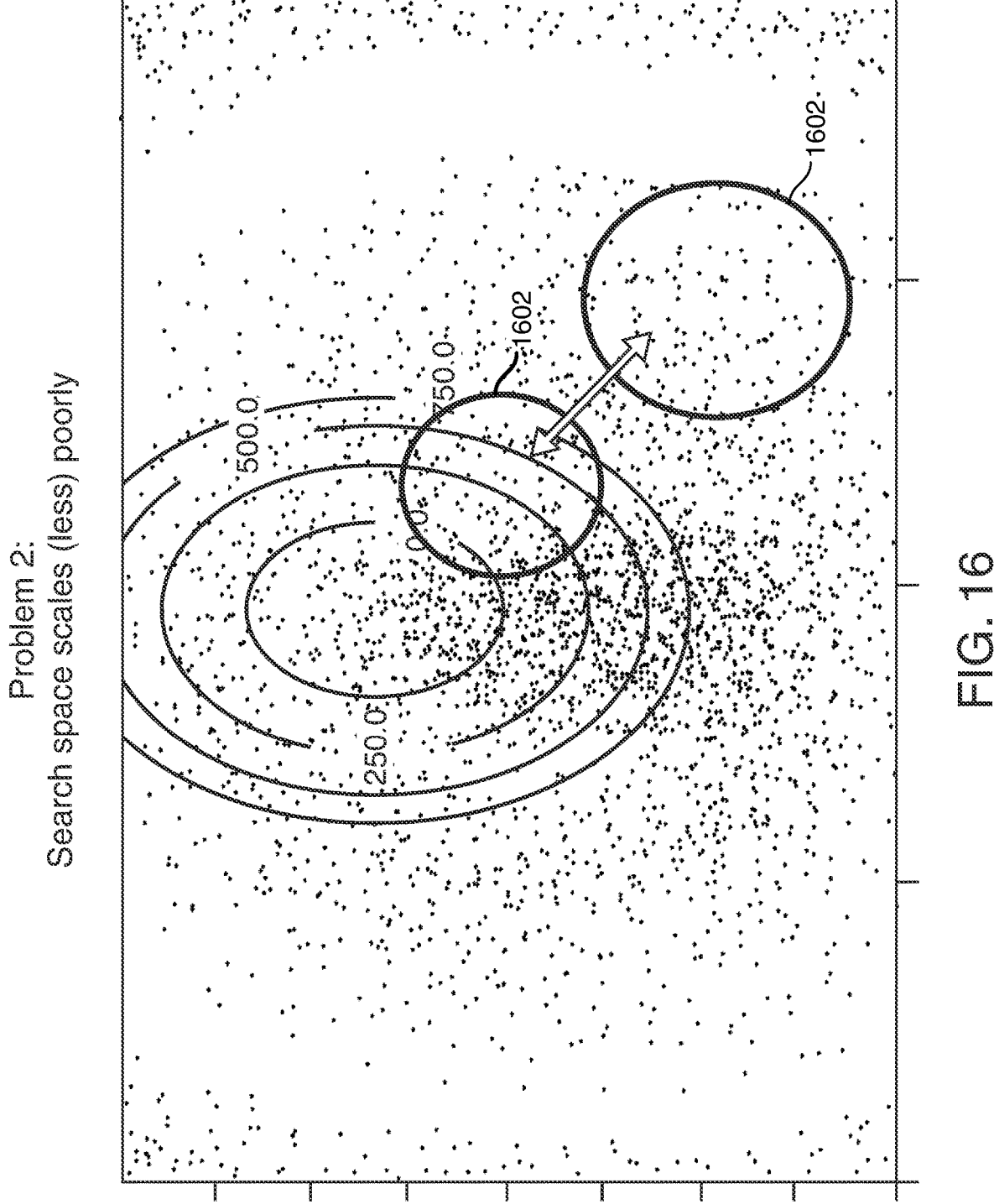

FIGS. 15-16 represent how search space (which may be represented by a first $\sigma$ at 1504 and a second $\sigma$ at 1506) scales poorly—i.e., fails to easily determine which direction is closer or further to the minimum along equation 1502. FIG. 16 shows another representation of the failure of regions identified by 1602 and 1604 to scale accurately for determination of a minimum, albeit less poorly than the scaling issue raised in FIG. 15.

FIGS. 15 and 16 describe foundational work, namely, a Gaussian Evolution Strategy and a Genetic Algorithm regarding same, respectively. This foundational work supports the later in Covariance Matrix Adaptation Evolution Strategy (CMA-ES), according to the disclosure set forth herein. The methods and systems, according to the embodiments, operate to present a static scaling factor to replace portions of the CMA-ES algorithm.

Figure 17:
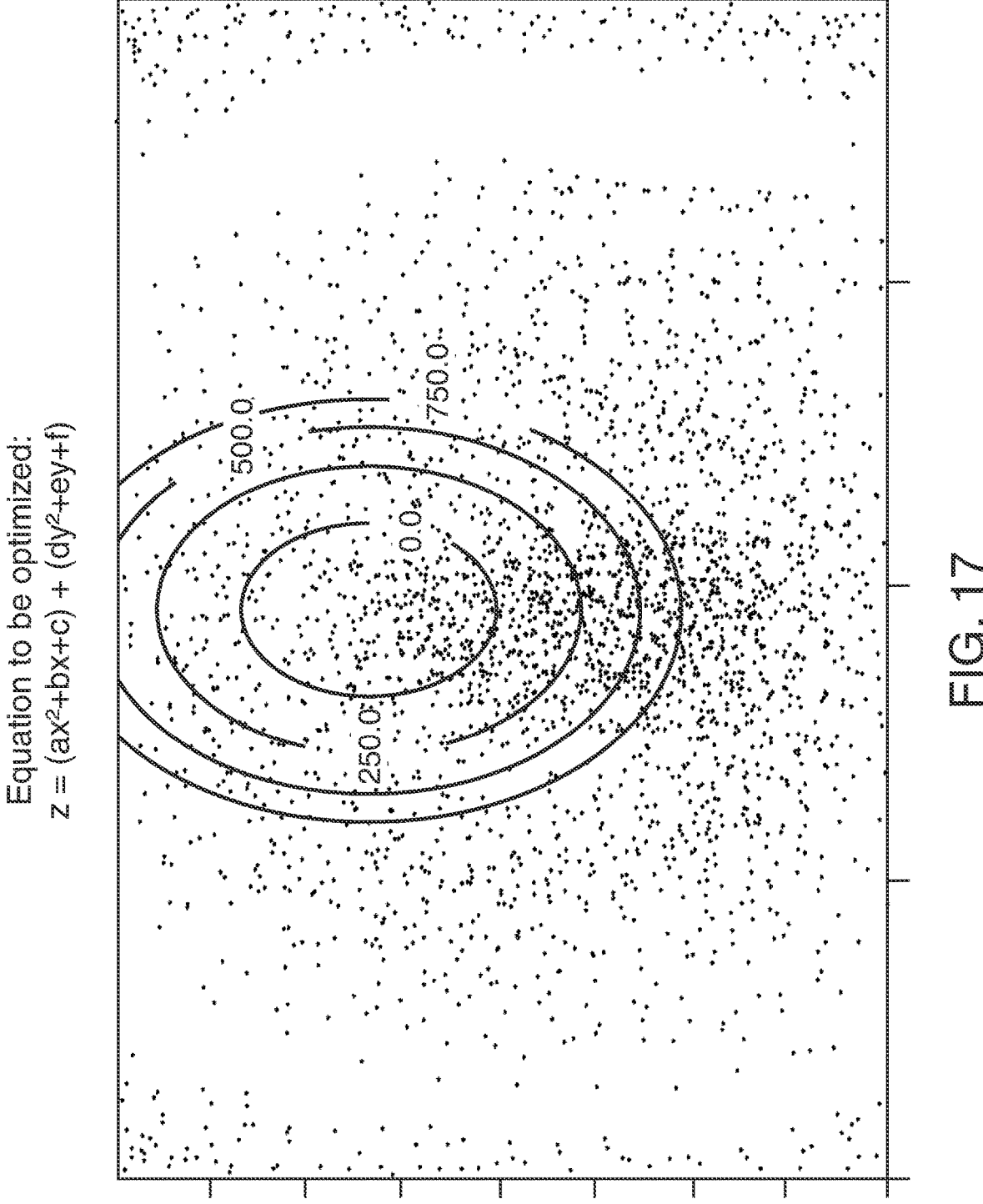
FIG. 17 shows a two-dimensional equation to be optimized.
Figure 18:
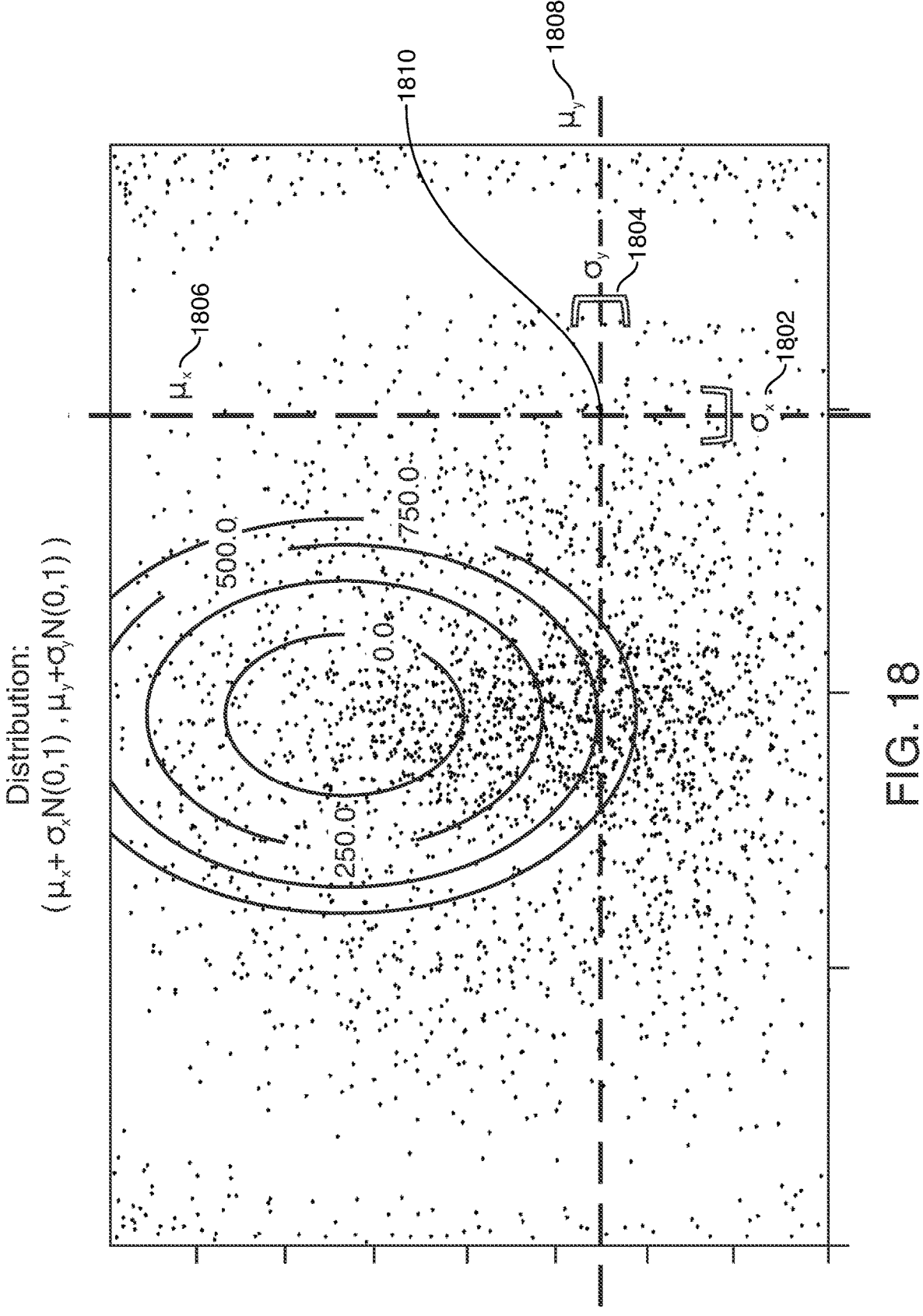
FIG. 18 shows a distribution in two dimensions.

In embodiments according to the disclosure, FIG. 17 shows a two-dimensional equation to be optimized $z=(ax^2+bx+c)+(dy^2+ey+f)$. FIG. 18 shows a distribution in two dimensions—$\mu_x$ 1806+$\sigma_x$ 1802 N(0,I), $\mu_y$ 1808+$\sigma_y$ 1804 N(0,I). A cross-hairs is formed between the two marker lines along $\sigma_y$ 1802 and $\sigma_y$ 1804, as indicated at point 1810. According to the embodiments, the point 1810 may preferably be used to derive an initiating random point to begin generating candidates for use in optimization according to the disclosure.

Figure 19:
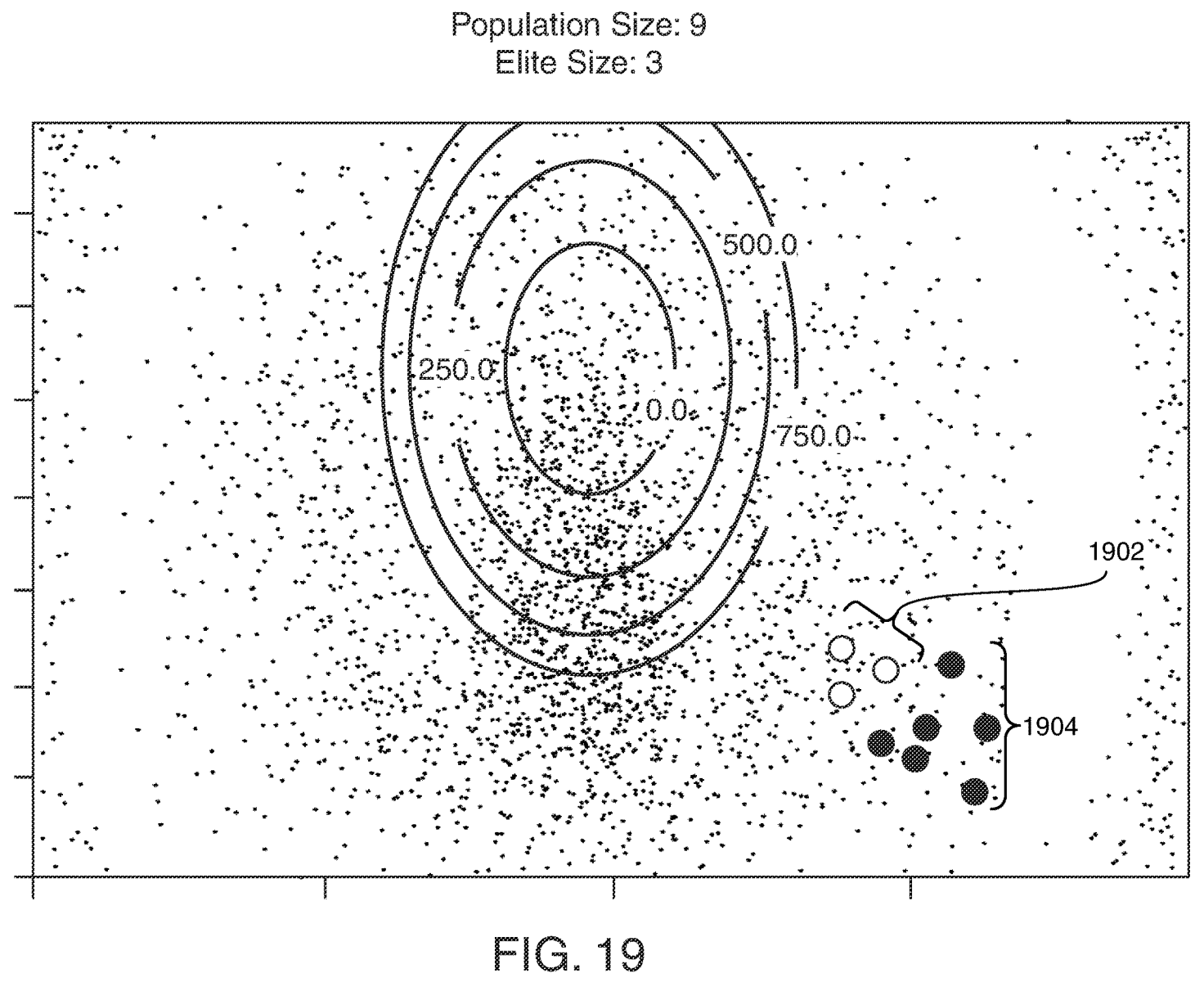

FIG. 19 shows generation of a population of candidates at a random location. Candidates 1904, which are the most distant from the minimum, are discarded. Candidates 1902, the closest to the minimum, may be used to determine a $\mu$ and a $\sigma$ value to obtain a new set of candidates.

Figure 20:
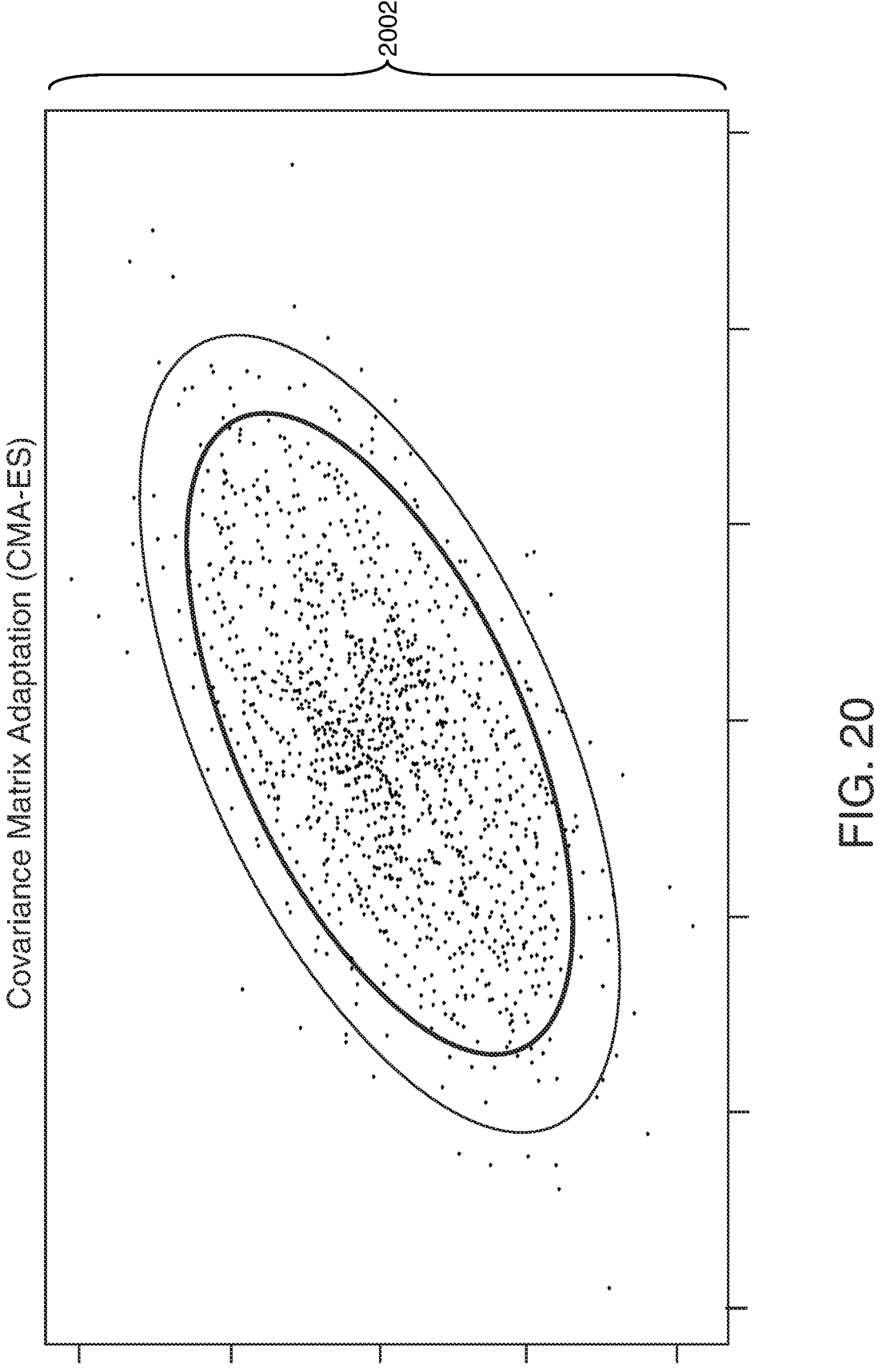
FIG. 20 shows a Covariance Matrix Adaptation Evolution Strategy.

At this point, FIG. 20 shows a Covariance Matrix Adaptation Evolution Strategy (CMA-ES) 2002. The CMA-ES, according to the disclosure, may be used to calculate a static scaling factor. The CMA-ES algorithm, according to the invention, incorporates a static scaling factor that preferably replaces select portions of a conventional evolutionary strategy algorithm.

Figure 23:
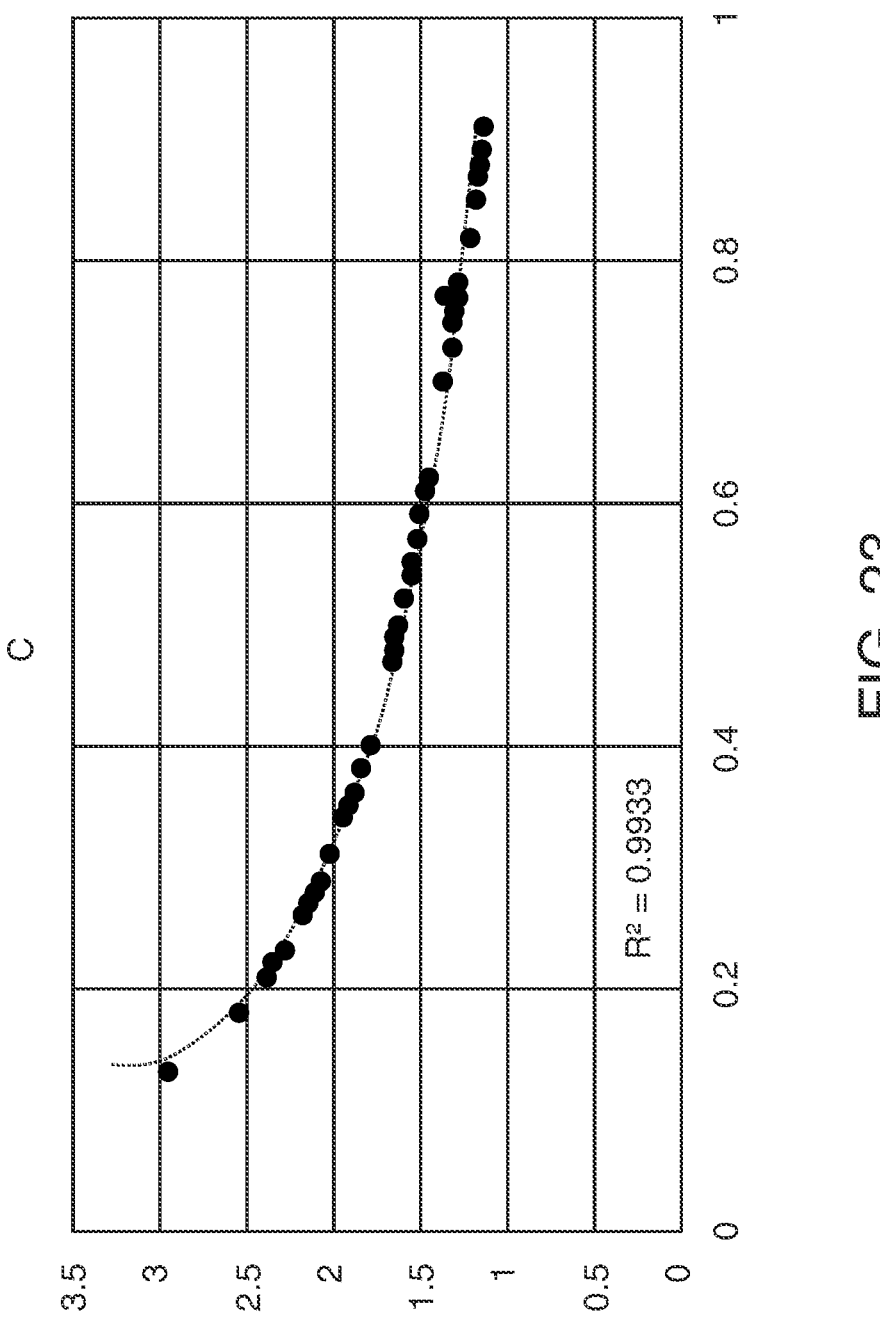
FIG. 23 is a curve showing multiple exemplary scaling factors according to the disclosure.

FIG. 23 shows multiple exemplary static scaling factors, according to one or more embodiments of the invention. These multiple exemplary static scaling factors may be used to produce a curve as shown in FIG. 23. An unique curve according to the disclosure is, in general, derived for each new problem/class of problems/equation/class of equations/surface/class of surfaces being worked on. Accordingly, the curve below in particular helps select a specific scaling factor for a given surface to be optimized. On the x-axis appears the ratio of number of elite (i.e., selected) candidates from a population of generated candidates to the number of the population of generated candidates, and on the y-axis appears the scaling factor that historically worked best (or worked relatively better than other scaling factors) for the corresponding ratio located in the x-axis ratio. Plotting these points, and fitting a curve to the plotted points, yields a general solution to the problem—i.e., providing a highly-efficient, and computer resource consumption-reducing, static scaling factor selection. It should be noted that the curve-fitting may be derived using known best-fit algorithms, or other similar mathematical derivations. It should be noted yet further that the correlation of the plotted points to the curve shown below is very—wherein $R^2=0.9933$.

Figure 21:
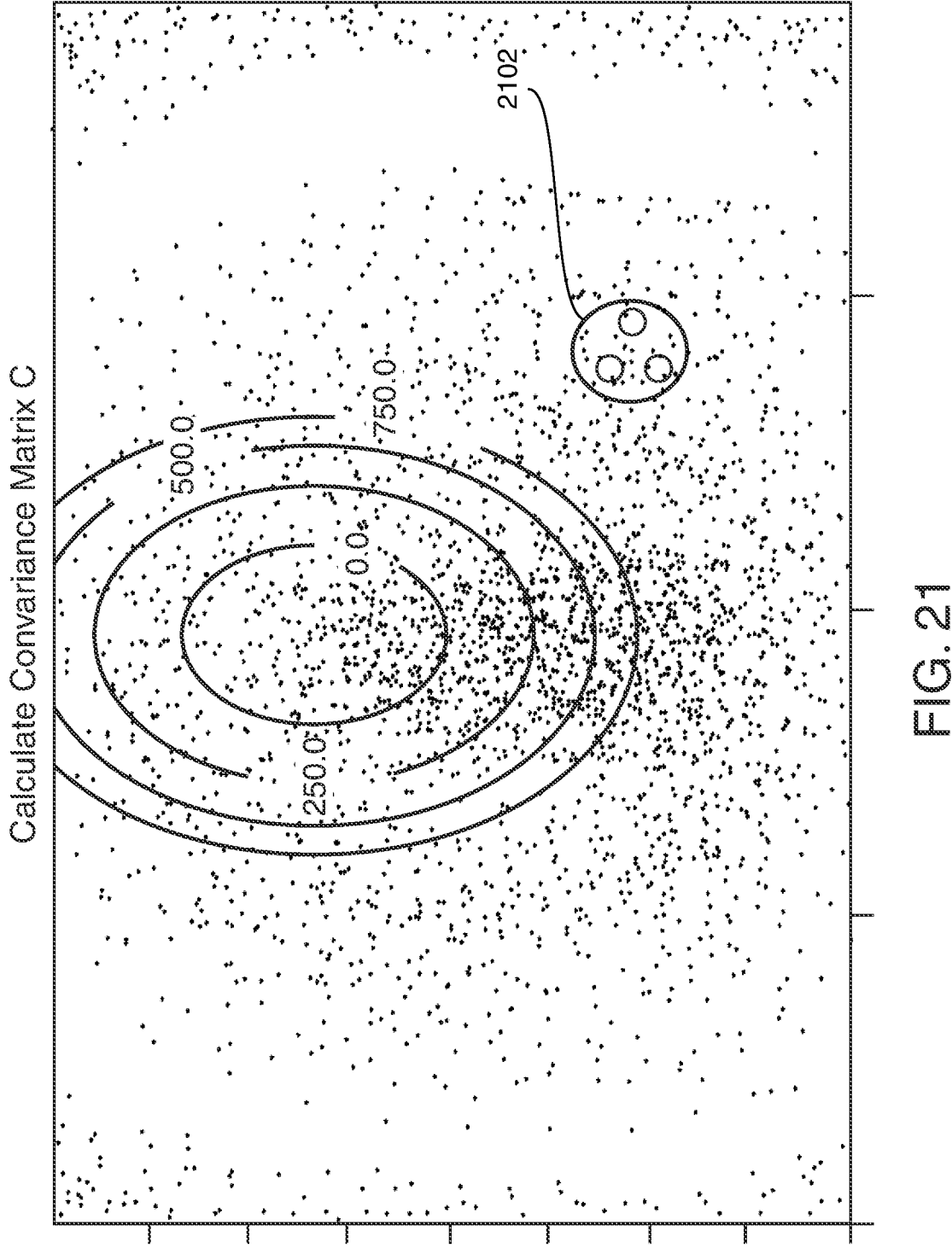
FIG. 21 shows calculating a Covariance Matrix C to express selected (or generated) candidates.

FIG. 21 shows calculating, according to the disclosure, a Covariance Matrix C to express selected (or generated) candidates 2102. In probability theory and statistics, a covariance matrix is a square matrix giving the covariance between each pair of elements of a given random vector. In the current disclosure, the given vector may, in certain embodiments, relate to a determined minimum of the surface. Any covariance matrix is typically symmetric and positive, semi-definite and its main diagonal contains variances.

Figure 22:
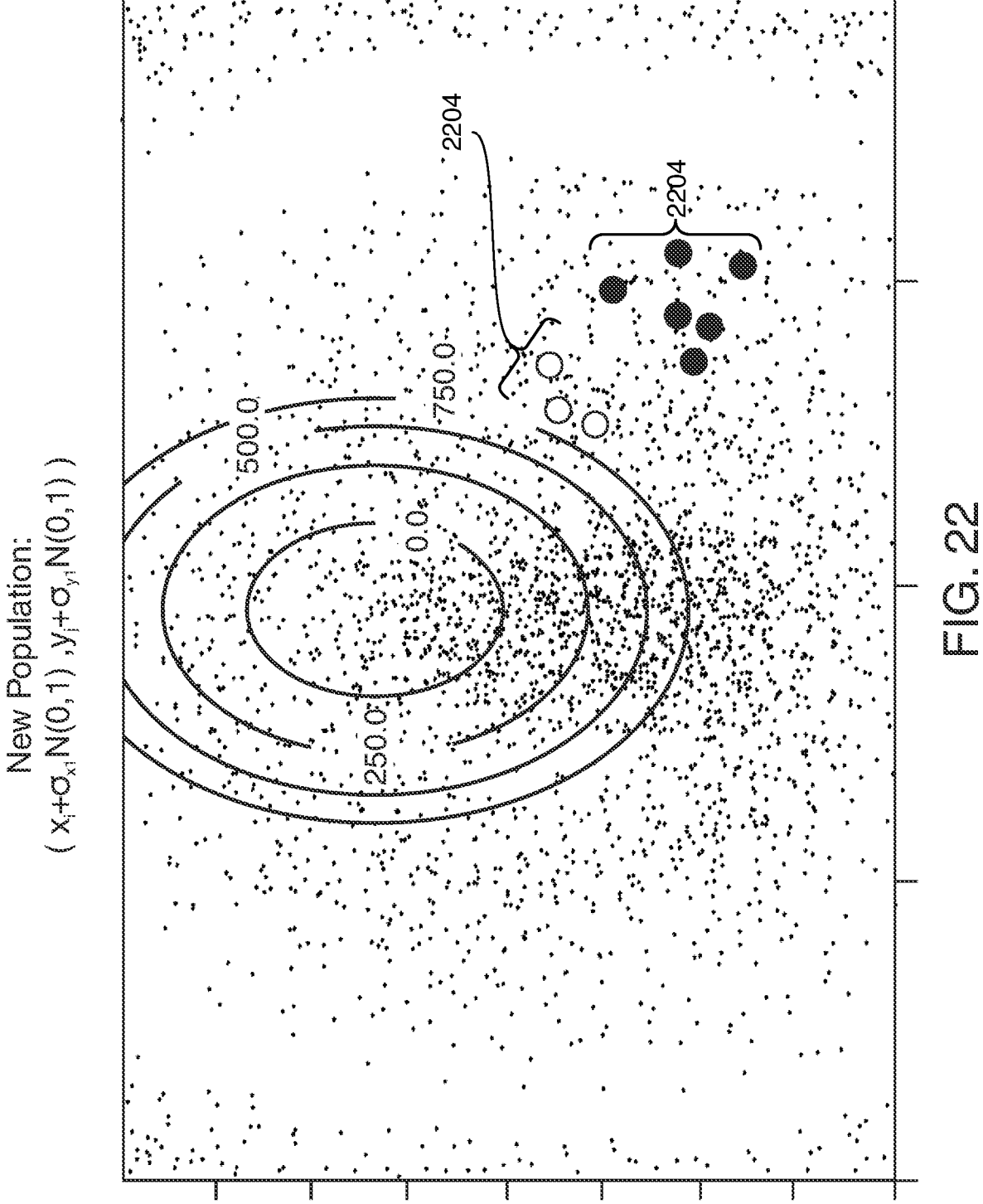
FIG. 22 shows generating a new population of candidates according to the embodiments of the disclosure.

FIG. 22 shows generating a new population of candidates according to the equation $(x_i+\sigma_{x_i}N(0,I), y_j+\sigma_{j_i}N(0,I))$ based on the Covariance Matrix C shown in FIG. 21.

It should be noted that APPENDIX A is attached hereto. Appendix A includes code for generating one or more static scaling factors according to the disclosure.

Thus, systems and methods related to INTELLIGENT SCALING FACTORS FOR USE WITH EVOLUTIONARY STRATEGIES-BASED ARTIFICIAL INTELLIGENCE (AI) are provided. Persons skilled in the art will appreciate that the present invention can be practiced by other than the described embodiments, which are presented for purposes of illustration rather than of limitation. The present invention is limited only by the claims that follow.

What is claimed is:

1. A method for optimizing an application of an evolutionary-strategy-based application of Artificial Intelligence (AI), said application being performed on a pre-determined surface, said application directed to reproducing a human voice using an electronic sound-reproducing device, said application using the AI to help electronic electronically reproduce the human voice to a replicate reality, said method comprising:

selecting a first group of candidate replicate realities;

determining a mean and standard deviation associated with the first group of candidate replicate realities;

using a static scaling factor to formulate a size of a population of candidate replicate realities for generation;

using the mean and the standard deviation to generate, according to the size, the population of candidate replicate realities;

selecting a second group of candidate replicate realities from among the population of candidate replicate realities, wherein each member of the second group of candidate replicate realities is closer to a minimum value of the surface than a remainder of the population of candidate replicate realities, said remainder of the population of candidate replicate realities being formed from a group of non-selected candidate replicate realities among the population of candidate replicate realities, and wherein the minimum value reflects the convergence of the replicate reality and the human voice, and the minimum represents the location of least quantifiable error.

2. The method of claim 1, further comprising deriving the static scaling factor from a ratio, said ratio comprising a number corresponding to the first group of candidate replicate realities divided by a number corresponding to the population of candidate replicate realities.

3. The method of claim 2, further comprising forming a representative graphical depiction of a plurality of static scaling factors.

4. The method of claim 2, further comprising generating an algorithm based on the surface, said algorithm derived from a plurality of static scaling factors, the algorithm for obtaining a predetermined static scaling factor in response to receiving a predetermined number of first candidate replicate realities and a predetermined number of a population of candidate replicate realities.

5. The method of claim 1, further comprising adapting a covariance matrix using the static scaling factor.

6. The method of claim 1, wherein the using the mean and the standard deviation to generate the population of candidate replicate realities comprises using the mean to locate the population of candidates along the pre-determined surface and using the standard deviation to determine the maximum distribution of the population of candidate replicate realities.

7. The method of claim 1, wherein the surface is defined by an equation.

8. One or more, non-transitory, computer-readable media storing computer-executable instructions which, when executed by a processor on a computer system optimize an application of an evolutionary-strategy-based application of Artificial Intelligence (AI), said application being performed on a pre-determined surface, said application directed to reproducing a human voice using an electronic sound-reproducing device, said application using the AI to help electronically reproduce the human voice to a replicate reality, said processor configured to:

select a first group of candidate replicate realities;

determine a mean and standard deviation associated with the first group of candidate replicate realities;

use a static scaling factor to formulate a size of a population of candidate replicate realities for generation;

use the mean and the standard deviation to generate, according to the size, the population of candidate replicate realities;

select a second group of candidates from among the population of candidate replicate realities, wherein each member of the second group of candidate replicate realities is closer to a minimum value of the surface than a remainder of the population of candidate replicate realities, said remainder of the population of candidate replicate realities being formed from a group of non-selected candidates among the population of candidate replicate realities, and wherein the minimum value reflects the convergence of the replicate reality and the human voice, and the minimum represents the location of least quantifiable error.

9. The media of claim 8, wherein the processor is further configured to derive the static scaling factor from a ratio, said ratio comprising a number corresponding to the first group of candidate replicate realities divided by a number corresponding to the population of candidate replicate realities.

10. The media of claim 9, wherein the processor is further configured to form a representative graphical depiction of a plurality of static scaling factors.

11. The media of claim 9, wherein the processor is further configured to generate an algorithm based on the surface, said algorithm derived from a plurality of static scaling factors, the algorithm for obtaining a predetermined static scaling factor in response to receiving a predetermined number of first candidate replicate realities and a predetermined number of a population of candidate replicate realities.

12. The media of claim 8, wherein the processor is further configured to adapt a covariance matrix using the static scaling factor.

13. The media of claim 8, wherein the mean and the standard deviation may be used, by the processor, to 1) generate the population of candidate replicate realities comprises using the mean to locate the population of candidate replicate realities along the pre-determined surface and to 2) generate the standard deviation to determine the maximum distribution of the population of candidate replicate realities.

14. The media of claim 8, wherein the surface is defined by an equation.

15. A method for optimizing an application of an evolutionary-strategy-based application of Artificial Intelligence (AI), said application being performed on a pre-determined surface, said application directed to reproducing a human voice using an electronic sound-reproducing device, said application using the AI to help electronically reproduce the human voice to a replicate reality, said method comprising:

arbitrarily generating a first group of candidate replicate realities, said first group of candidate replicate realities comprising a number of candidate replicate realities;

determining a mean and standard deviation associated with the first group of candidate replicate realities;

formulating a static scaling factor based at least in part on the number of candidate replicate realities in the first group of candidate replicate realities;

selecting a portion of the first group of candidate replicate realities to form an evolved group of candidate replicate realities; and using the mean, the standard deviation and the static scaling factor to generate a new population of candidate replicate realities based on the evolved group of candidate replicate realities;

wherein each member of the evolved group of candidate replicate realities is closer to a minimum value of the surface than a remainder of the first group of candidate replicate realities, said remainder of the first group of candidate replicate realities being formed from a group of non-selected candidate replicate realities among the first group of candidate replicate realities, and wherein the minimum value reflects the convergence of the replicate reality and the human voice, and the minimum represents the location of least quantifiable error.

16. The method of claim 15, further comprising deriving the static scaling factor from a ratio, said ratio comprising a number corresponding to the evolved group of candidate replicate realities divided by the number corresponding to the first group of candidate replicate realities.

17. The method of claim 16, further comprising forming a representative graphical depiction of a plurality of static scaling factors.

18. The method of claim 16, further comprising generating an algorithm based on the surface, said algorithm derived from a plurality of static scaling factors, the algorithm for obtaining a predetermined static scaling factor in response to receiving a predetermined number of first candidate replicate realities and a predetermined number of a population of candidate replicate realities.

19. The method of claim 15, further comprising adapting a covariance matrix using the static scaling factor.

20. The method of claim 15, wherein the using the mean and the standard deviation to generate the new population of candidate replicate realities comprises using the mean to locate the new population of candidates along the predetermined surface and using the standard deviation to determine the maximum distribution of the new population of candidate replicate realities.

21. The method of claim 15, wherein the surface is defined by an equation.

* * * * *